United States Patent [19]

Scanlon et al.

[11] 4,400,412

[45] Aug. 23, 1983

[54] THERMOCHROMIC VANADIUM OXIDE COATED GLASS

[75] Inventors: J. Kevin Scanlon, Pittsburgh; Charles B. Greenberg, Murrysville, both of Pa.

[73] Assignee: PPG Industries, Inc., Pittsburgh, Pa.

[21] Appl. No.: 344,860

[22] Filed: Feb. 1, 1982

[51] Int. Cl.[3] .......................... B05D 5/12; B05D 3/02; C03C 17/245

[52] U.S. Cl. ....................................... 427/87; 427/109; 427/160

[58] Field of Search .......................... 427/87, 109, 160

[56] References Cited

U.S. PATENT DOCUMENTS 3,483,110 12/1969 Rozgonyi ............................ 204/192

4,307,942 12/1981 Chahroudi .......................... 350/353

*Primary Examiner*—James R. Hoffman

*Attorney, Agent, or Firm*—Donna L. Seidel

[57] ABSTRACT

A method is disclosed for producing a thermochromic window comprising a glass substrate and a coating containing $VO_2$ by chemical vapor deposition employing vanadium n-propylate in an oxidizing atmosphere.

5 Claims, 2 Drawing Figures

THERMOCHROMIC VANADIUM OXIDE COATED GLASS

FIELD OF THE INVENTION

The present invention relates generally to the art of metal oxide coated glass for solar energy control and more particularly to the art of thermochromic vanadium oxide.

THE PRIOR ART

U.S. Pat. No. 3,483,110 to Rozgonyi discloses a method for making thin films of $VO_2$ that possess the essential metal-semiconductor phase transition exhibited by the single crystal form, and that do not suffer deterioration under repeated cycling through the transition. In one embodiment, the process involves the steps of sputtering a $V_2O_5$ cathode in an inert atmosphere in the presence of a desired substrate to produce an amorphous film of $VO_x$, where x is greater than 1.5 but less than 2, and then either weakly oxidizing the film to $VO_2$, or strongly oxidizing the film to $V_2O_5$ and then reducing the $V_2O_5$ to $V_2O_3$. Alternatively, a vanadium cathode may be sputtered in an inert atmosphere in a similar manner to produce a polycrystalline vanadium film, which is first oxidized to $V_2O_5$ and then reduced to $V_2O_3$.

U.S. patent application Ser. No. 344,257 filed on even date herewith and entitled "Chemical Vapor Deposition of Vanadium Oxide Coatings" discloses the use of vanadium n-propylate to prepare an electroconductive film of $V_2O_3$ by chemical vapor deposition.

SUMMARY OF THE INVENTION

The present invention involves the chemical vapor deposition of a film containing $VO_2$ from a liquid organovanadium compound such as vanadium n-propylate. The vanadium oxide film exhibits both electrical and optical switching at a nominal transition temperature of about 68° C. Glass coated with a vanadium oxide film in accordance with the present invention is particularly useful for passive solar energy control since it has significantly lower infrared transmittance in the metallic phase compared with the infrared transmittance of the semiconducting phase.

DETAILED DESCRIPTION OF THE PREFERRED EMBODIMENTS

Numerous metal and/or metal oxide coatings are known to be useful for solar energy control. Such coatings typically reflect a high proportion of incident solar energy to minimize heat gain inside a structure, while allowing sufficient transmission of the visible portion of the spectrum for interior lighting. A particularly desirable architectural window for passive solar energy control would be a variable transmittance window that would minimize transmittance when incident solar energy is at a maximum. Variable transmittance in a glass window is achievable by photochromism, which involves darkening in response to ultraviolet radiation from the sun, typically using silver halides. However, absorption by the glass of solar radiation over the entire spectrum results in heating and bleaching which deteriorate the photochromic properties of the glass.

The present invention achieves variable transmittance by means of a thermochromic response, an optical switching which occurs when a vanadium oxide film is heated by absorbed solar energy. Vanadium oxide films containing thermochromic $VO_2$ are prepared in accordance with the present invention by chemical vapor deposition from a liquid organovanadium compound such as vanadium n-propylate. To be useful as a thermochromic window for passive solar energy control, the vanadium oxide coating should provide large optical switching in the solar infrared spectral range, a temperature range for switching that matches the actual temperature attained by a window exposed to solar radiation, and adequate switching properties at a film thickness thin enough to avoid iridescence. These properties may be provided by a $VO_2$ film prepared in accordance with the present invention.

Figure 1:
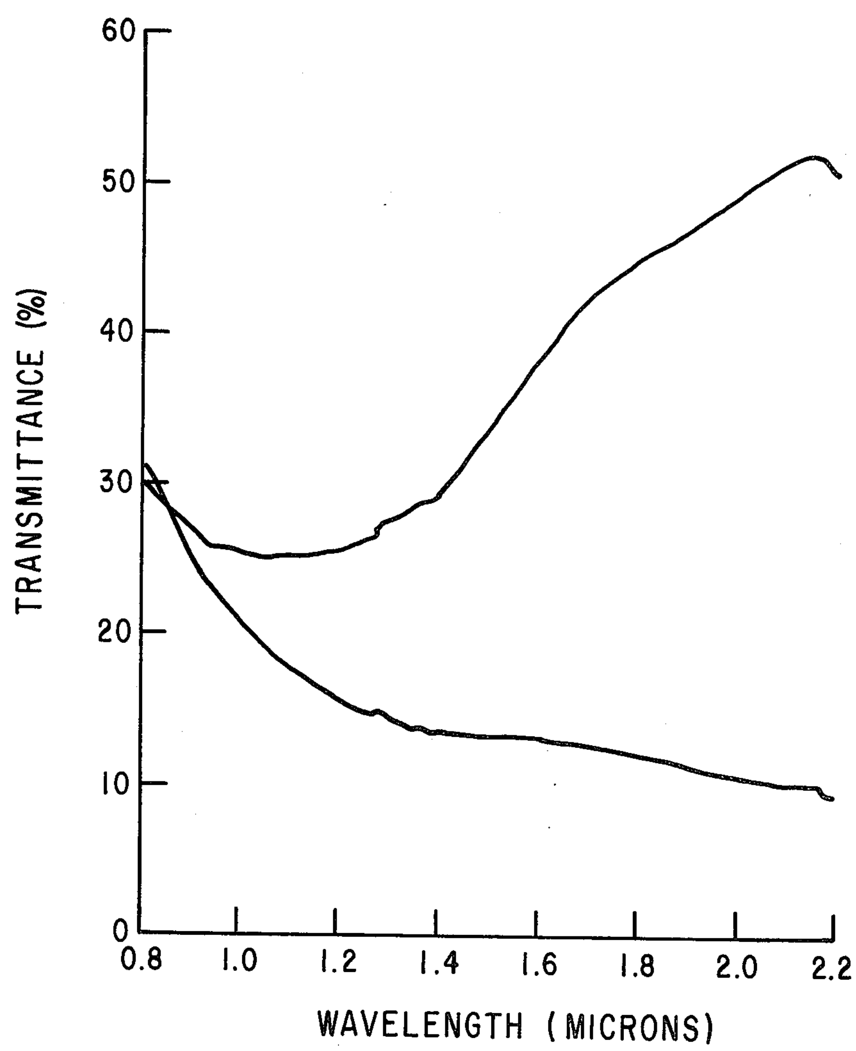
FIG. 1 illustrates the optical switching of a vanadium oxide film in accordance with the present invention by comparing the solar energy transmittance of a coated glass sample at ambient temperature with the transmittance of the sample heated above the transition temperature of the vanadium oxide film.
Figure 2:
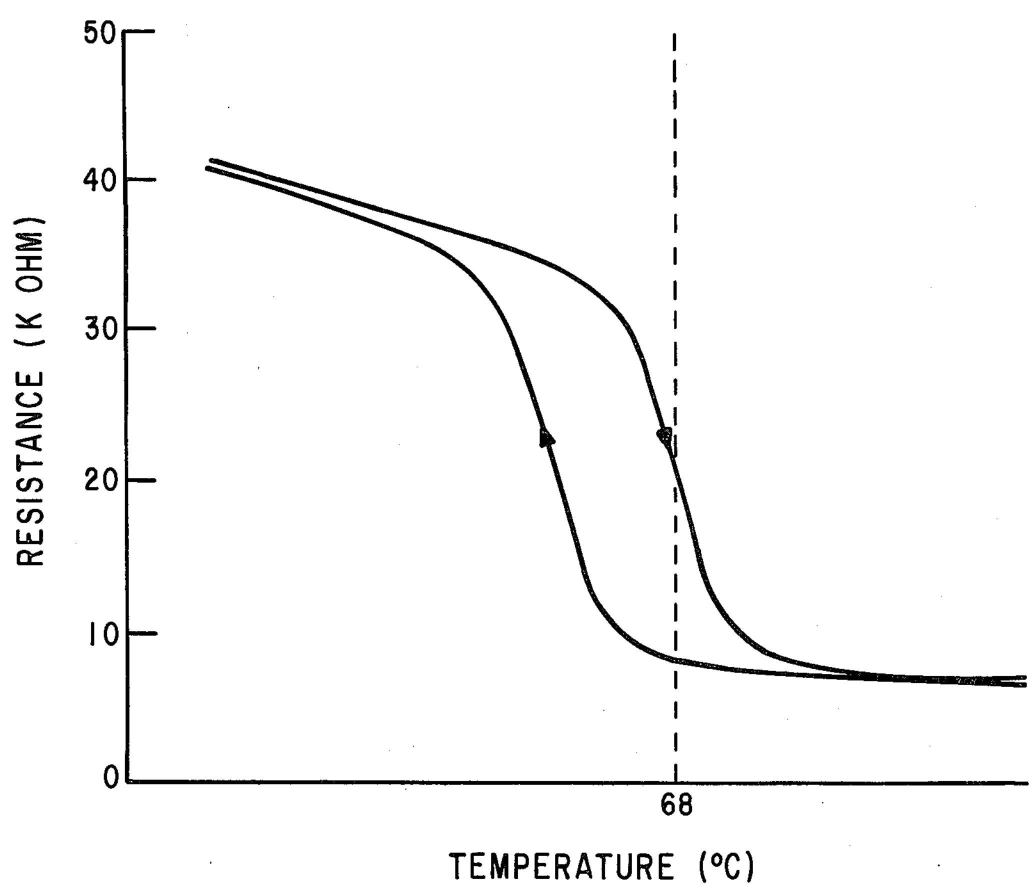
FIG. 2 illustrates the transition temperature range by showing the electrical resistance as a function of the temperature.

Vanadium oxide ($VO_2$) undergoes a phase transition from the monoclinic crystallographic class to the tetragonal at a nominal temperature of 68° C. This phase transition is accompanied by a rapid switch in electrical resistivity from semiconducting behavior to metallic, a resistivity change of about $10^3$ to $10^5$-fold for a single crystal. A vanadium oxide film in accordance with the present invention exhibits an electrical switching as shown in FIG. 2 as well as a substantial optical switching in the infrared spectral region as shown in FIG. 1.

Thin films of vanadium oxide can be prepared on a variety of glass substrates by chemical vapor deposition using an organovanadium compound, preferably in liquid form. Soda-lime-silica float glass and borosilicate glass are useful as substrates. The glass substrates are preheated, typically to a temperature of at least about 400° C., in a conventional tube furnace open at both ends for ingress and egress of the substrates. An air driven pusher arm may be employed to feed a substrate into and out of the heating zone and onto a conveyor belt which carries the substrate to a CVD coating chamber located in an exhaust hood. The CVD coating chamber contains liquid vanadium n-propylate, which is heated to a sufficiently high temperature to vaporize the vanadium compound. A mixture of nitrogen and oxygen is then employed to carry the organovanadium compound vapors to the heated substrate, whereupon the vanadium n-propylate pyrolyzes to form vanadium oxide, $VO_2$. The $VO_2$ coated glass is passed into an annealing chamber, wherein the vanadium oxide coated glass is cooled to ambient temperature. The atmosphere in the chamber may be either air or forming gas. The resultant vanadium oxide coated glass is semiconducting at ambient temperatures with a solar infrared transmittance typically above 30 percent at wavelengths between 0.8 and 2.2 microns, while above the transition temperature, nominally 68° C., the $VO_2$ containing film is characteristically metallic and has a solar infrared transmittance less than about 15 percent.

To enhance the optical response of a vanadium oxide film, it may be useful to prime the glass surface prior to chemical vapor deposition of the vanadium oxide coating. Optimum priming may be obtained with a tin oxide coating, typically 700 to 800 Angstroms thick. The tin oxide primer coating is preferably prepared by pyrolytic deposition of an organotin compound. Silicon and titanium dioxide films are also useful as primers. The use of such primer films, especially $SnO_2$, appears to enhance the formation of $VO_2$ rather than other vanadium oxides, thereby resulting in a $VO_2$ rich film which has very good optical switching properties.

The optical switching properties of the vanadium oxide coating are determined by scanning in the transmittance mode with a Cary 14 spectrophotometer across the spectral range of 0.8 to 2.2 microns. The vanadium oxide coated glass sample is held in an insulated holder with a beam pass opening. Two cylindrical 25 watt heaters in contact with the glass edges just outside the beam pass opening are used to heat the vanadium oxide coated glass sample through the switching temperature range. A spectral scan is run both before and after heating without moving the sample. The optical switching for a vanadium coated glass sample in accordance with the present invention is shown in FIG. 1.

The temperature range of the optical switching is determined in a separate experiment, which also provides a measure of the thermoresistive switching. The flat-head probe of an Omega Amprobe ® Fastemp temperature measuring device is clipped onto the vanadium oxide film surface. In close proximity on either side of the probe are placed alligator clips attached to an ohmmeter to measure the resistance. The resistance as a function of temperature for a vanadium oxide coated glass sample in accordance with the present invention is shown in FIG. 2.

In general, it appears that of the $10^3$ to $10^5$-fold thermochromic resistive switching capability of vanadium oxide, a thermoresistive switching on the order of about two fold is sufficient to correlate to optical switching of the required magnitude for passive solar energy control. The temperature range of optical switching is near the range of 45° to 60° C. actually attained in windows in summertime southern exposure, and it appears that optical switching properties are attainable with vanadium oxide films sufficiently thin to avoid visible iridescence.

The present invention will be further understood from the description of a specific example which follows.

EXAMPLE I

A glass substrate is preheated to 635° C. and contacted with a solution of two parts by volume dibutyltin diacetate and one part by volume methanol to form a tin oxide primer film. The primed glass passes through a chemical vapor deposition chamber wherein liquid vanadium n-propylate is heated to 127° C. in order to vaporize the vanadium compound. The vapors are carried in a mixture of 90 percent by volume nitrogen and 10 percent by volume oxygen to a moving glass substrate at a temperature of about 530° C. A vanadium oxide film containing $VO_2$ is formed on the glass substrate. The vanadium oxide film is yellow by transmission in fluorescent lighting. This film exhibits optical switching as shown in FIG. 1 and electrical switching as shown in FIG. 2.

The above example is offered to illustrate the present invention. Other glass substrates, such as borosilicate glass, may be used in the production of thermochromic windows in accordance with the present invention. Various atmospheres comprising mixtures of inert gases, such as argon, and oxygen may also be used provided that the atmosphere is sufficiently oxidizing to form a film comprising sufficient $VO_2$ to provide thermochromic properties, but insufficiently oxidizing to form a film which is not thermochromic as a result of the predominance of the more highly oxidized $V_2O_5$.

The scope of the present invention is defined by the following claims.

We claim:

1. A method for making a thermochromic window comprising the steps of:

a. heating a glass substrate to a sufficient temperature to convert vanadium n-propylate to vanadium oxide;

b. vaporizing vanadium n-propylate;

c. conveying the vaporized vanadium n-propylate to said substrate in an atmosphere sufficiently oxidizing to form a thermochromic film comprising $VO_2$ but insufficiently oxidizing to form a film which is not thermochromic as a result of the proportion of $V_2O_5$;

d. contacting a surface of said heated glass substrate with said vapor of vanadium n-propylate in said oxidizing atmosphere to deposit thereupon a film containing $VO_2$.

2. The method according to claim 1, wherein the glass substrate is heated to a temperature of at least 400° C. and said atmosphere comprises a mixture of inert gas and oxygen.

3. The method according to claim 2, wherein the glass substrate is heated to a temperature of at least 500° C. and said atmosphere comprises a mixture of nitrogen and oxygen.

4. The method according to claim 3, wherein said atmosphere comprises 90 percent by volume nitrogen and 10 percent by volume oxygen.

5. The method according to claim 1, wherein the film containing $VO_2$ is deposited to a thickness of about 100 to 1,500 Angstroms.

* * * * *